No. 672,694. Patented Apr. 23, 1901.
E. R. BESEMFELDER.
APPARATUS FOR THE MANUFACTURE OF ILLUMINATING GAS AND COKE.
(Application filed Sept. 28, 1900.)
(No Model.) 2 Sheets—Sheet 2.

Witnesses.
J. H. Niles.
G. C. Gibel.

Inventor.
Edward R. Besemfelder.

UNITED STATES PATENT OFFICE.

EDUARD R. BESEMFELDER, OF CHARLOTTENBURG, GERMANY.

APPARATUS FOR THE MANUFACTURE OF ILLUMINATING-GAS AND COKE.

SPECIFICATION forming part of Letters Patent No. 672,694, dated April 23, 1901.

Application filed September 28, 1900. Serial No. 31,410. (No model.)

*To all whom it may concern:*

Be it known that I, EDUARD R. BESEMFELDER, a citizen of the Empire of Germany, residing in Charlottenburg, in the Kingdom of Prussia and Empire of Germany, have invented certain new and useful Improvements in Apparatus for Manufacturing Illuminating-Gas and Coke, of which the following is a specification.

This invention relates to certain improvements in apparatus for manufacturing illuminating-gas and coke; and the invention consists, for the purpose of producing an effective and economical apparatus of this kind, in the combination of a series of connected superposed retorts, rotary conveyers therein, a conducting-tower having a rotary delivery mechanism for the glowing coke below its lower contracted end, means for connecting water-gas generators with said delivery mechanism, and a coke-cooling chamber below said tower.

The invention consists, further, in certain other combinations of operative parts, which will be fully described hereinafter and finally claimed.

Figure 1:
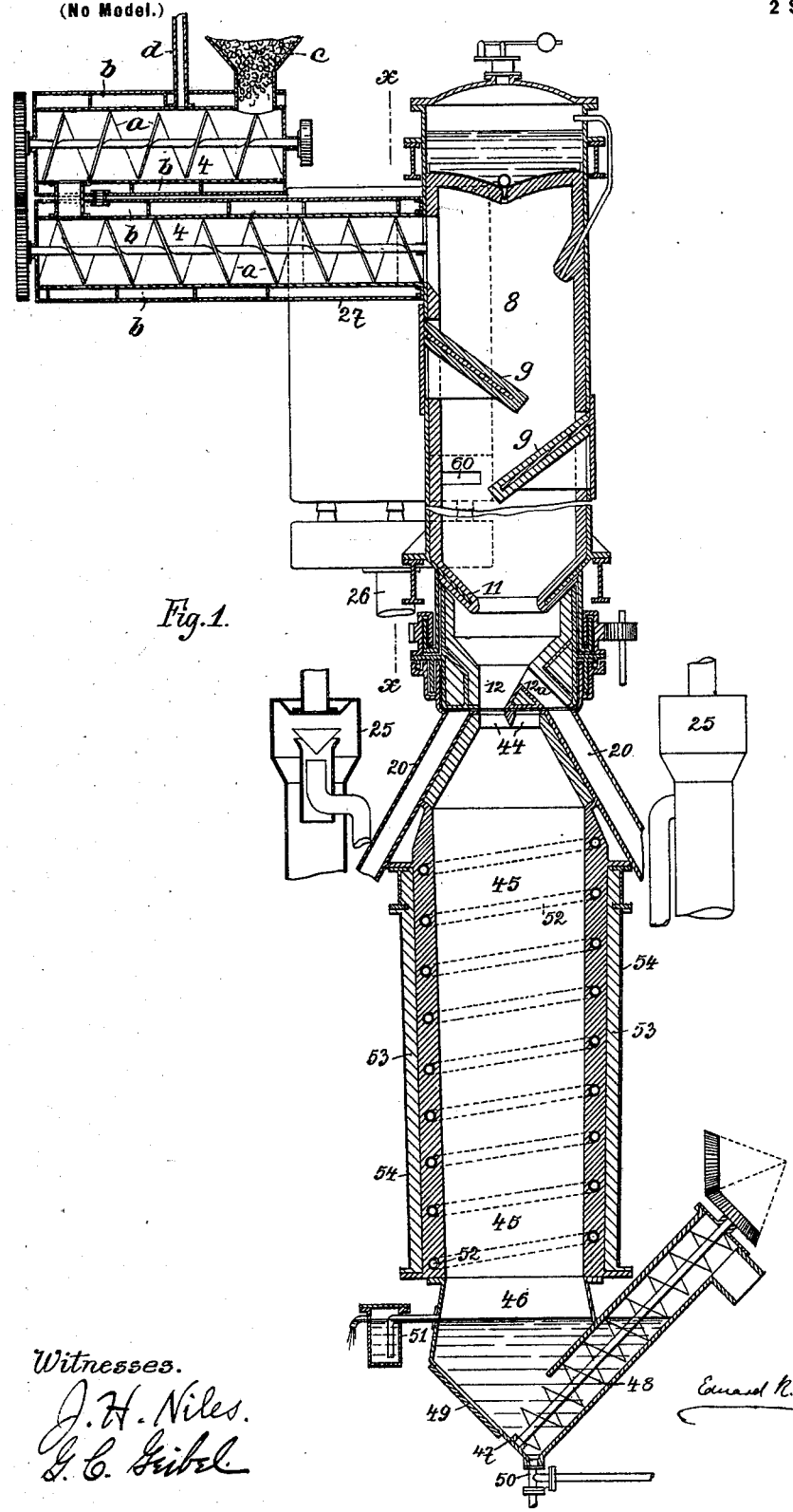
Figure 2:
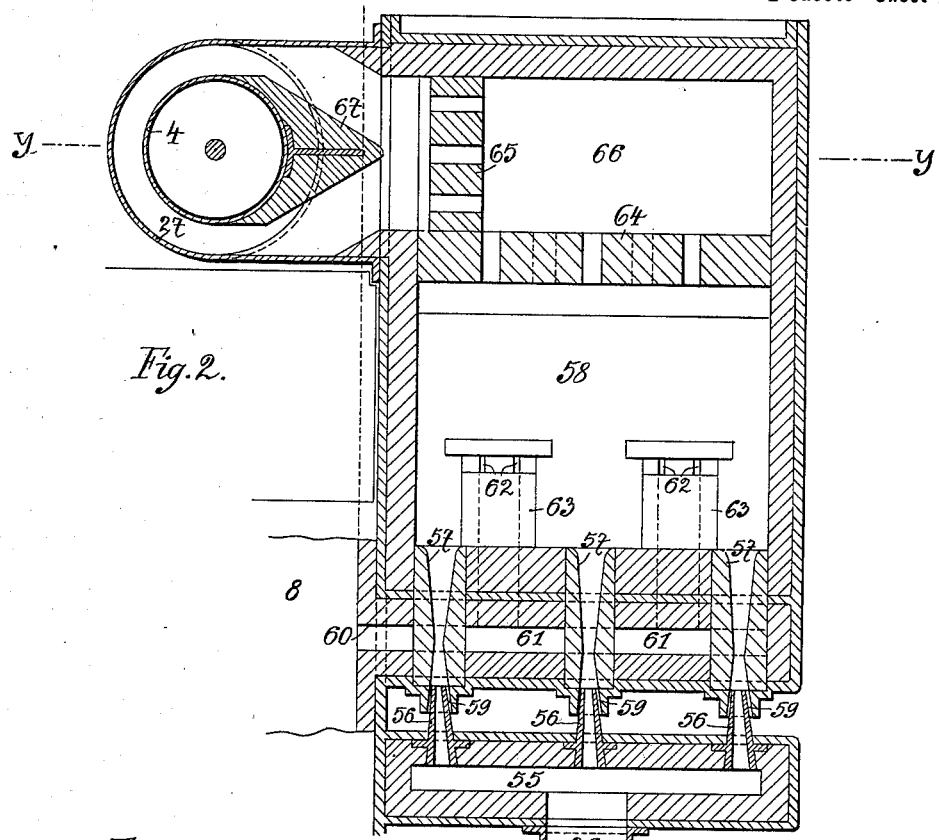
Figure 3:
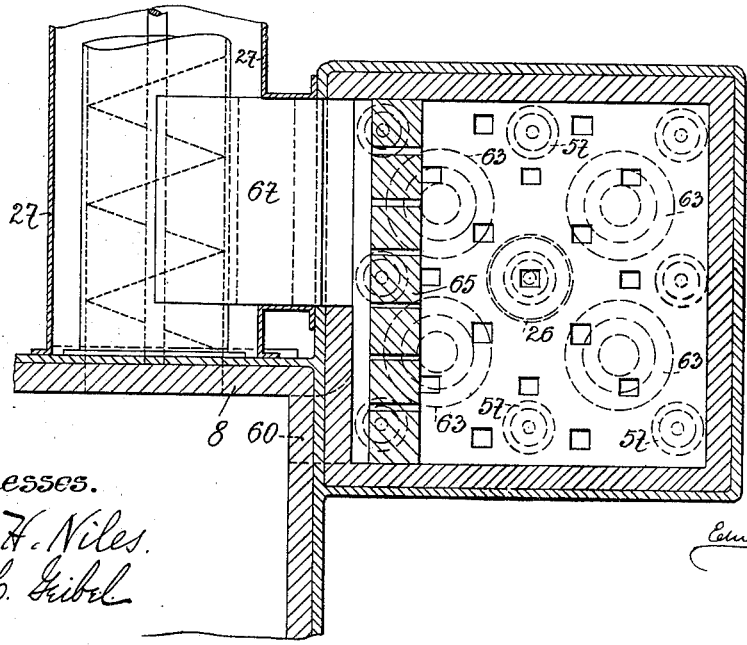

In the accompanying drawings, Figure 1 represents a vertical section through my improved apparatus, the water-gas generators, however, being omitted. Fig. 2 is a vertical section, on a larger scale, through a chamber for mixing the gases of combustion on line $xx$, Fig. 1; and Fig. 3 is a horizontal section through said chamber on line $yy$, Fig. 2.

Similar characters of reference indicate corresponding parts.

Referring to the drawings, 4 4 indicate two superposed connected retorts provided at the interior with suitable screw conveyers $a$ and surrounded by heating-flues $b$. Coal or other carbonaceous material is supplied to the series of retorts by hopper $c$. It undergoes distillation in the retorts and is discharged as glowing coke into the conducting-tower 8, the gas produced in the retorts passing out of the same by pipe $d$. The funnel-shaped throat 11 of the tower or shaft 8 is so formed and arranged that the carbonaceous material dropping successively down over the inclined shelves 9 of said tower 8 is spread equally over the surface of the distributing-cone 12. The latter is also funnel-shaped and retards thereby the downward movement of the glowing coke, so that its proper distribution is secured.

In the side faces of the rotatable distributing-cone openings $12^a$ of suitable size are provided, corresponding in number to the number of water-gas generator working at one time, each generator being connected therewith by a conduit 20. A portion of the glowing coke passing from the tower goes by these conduits to the generators, while the rest of the coke passes down through the central opening 44 into the cooling-chamber 45, which latter has, preferably, a capacity for holding the material of about four hours' work. This cooling-chamber is a shaft slightly contracted toward its lower end and opening into a discharge-pit 46. The latter is constructed, preferably, of iron and supports the cooling-chamber 45. The bottom of said discharge-pit has a central channel 47 filled with water, and from this channel an inclined rotary conveyer 48, having a perforated conveying-screw for allowing the return of the water, carries the cooled coke out of the apparatus. The speed of the conveyer is so regulated as to remove the cooled coke no faster than glowing coke is supplied into the chamber, so that the cooling-chamber is constantly filled with the downwardly-passing coke.

In the discharge-pit 46, having the manhole 49, a uniform height of water is maintained by pipe 50, which serves as both an inlet and discharge-pipe, and the overflow device 51. The hot coke falls into the water and is fully extinguished and cooled. As the apparatus is water sealed the steam produced by contact of the glowing coke with the water must pass back through the glowing coke in the chamber, the steam being heated more and more by absorption of the heat from the glowing mass. The coke is thus progressively cooled as it descends and the generation of gas and ammonia from the coke is rendered very efficient. Owing to the entire exclusion of air, loss of carbon does not occur, nor loss of gas. The shaft of the cooling-chamber is constructed of cast-iron or provided with a lining of refractory material, such as fire-brick. The lining of the cooling-chamber may contain a spiral steam-pipe 52, leading from the lower to the upper end, the steam superheated therein being required for the water-gas generators. Loss of heat and oxidation of the cast-iron shell of the chamber is prevented by a covering 53 of any suitable poor conductor of heat, which is retained in place by a shell 54 of thin sheet metal. In this manner the walls of the cooling-chamber are cooled and the heat of the coke utilized for producing superheated steam.

The waste gases obtained by the hot-blowing of the water-gas generators are utilized for the exterior heating of the retorts 4, being conducted from the water-gas generators, through dust-collectors 25, into tube 26, which is connected with the lower end of a mixing-chamber, said chamber being arranged between the jacket 27 of the lowermost retort and said tube 26. Said chamber consists of an anterior chamber 55, receiving under pressure the hot waste gases through tube 26. From this chamber 55 the waste gases blow through injector-tubes 56 and corresponding concentric nozzles 57 into the main chamber 58, thereby sucking fresh air through the ring-slots 59. From the tower 8 a small amount of the produced hot gases or of gases from which the valuable by-products of the coke distillation have been already separated is introduced through an opening 60 into the second anterior chamber 61, said gases flowing out into the main mixing-chamber through holes 62 of caps 63, having deflecting-covers. The mixing and ignition of all these gases partly superheated are so arranged that the gases from the injectors 57 meet those from the holes 62 at right angles by reason of the deflecting covers or caps 63 and then pass through two fire-bridges 64 and 65, having a plurality of conducting holes and slots and arranged at right angles to each other, so as to effect the complete combustion of the fire-gases flowing from chamber 66 to the jacket 27 of the lowermost retort 4. A cone 67, arranged in front of said retort toward the fire-bridge 65, secures the required distribution of the heating-gases. By regulating the admission of the air at the ring-slots 59 the temperature of the heating-gases can be thus graded, so as to prevent an overheating of the retorts. It is obvious that all parts immediately in contact with the hot gases—such as the chambers 55, 61, 58, and 66—must be provided with a lining of suitable refractory material.

The water-gas generators may be of any well-known type, alternately generating water-gas and waste gases, and it is not necessary to give a detailed description of the same.

The coke passing down into the cooling-chamber carries with it about seventy per cent. of the whole nitrogen corresponding to its quantity of coal. This nitrogen was heretofore lost in producing coke. By this systematic treating with the steam from the cooling-bath, said steam becoming itself more and more heated by passing upwardly through the glowing coke and also cooling the downwardly-passing coke correspondingly, a very large portion of said nitrogen is eliminated as ammonia, so that the gain of ammonia is a very large one. The tall cooling-shaft produces a very hard and useful coke through the slow cooling, the compression under the influence of the contraction of the shaft or chamber, and the weight of the white-hot coke.

Having thus described my invention, I claim as new and desire to secure by Letters Patent—

1. In an apparatus for the continuous production of illuminating-gas, the combination of a series of connected superposed retorts, rotary conveyers therein, a conducting-tower having a rotary delivery mechanism for the glowing material below its lower contracted end, means for connecting water-gas generators with said delivery mechanism, and a coke-cooling chamber below said tower, substantially as set forth.

2. In an apparatus for the continuous production of illuminating-gas, the combination of a series of connected superposed retorts, rotary conveyers therein, a conducting-tower, a rotary delivery mechanism beneath the same, chutes leading from the same to water-gas generators, a coke-cooling chamber below said tower and connected with said delivery mechanism, a water-filled discharge-pit beneath said cooling-chamber, and means for carrying the cooled coke out of said discharge-pit, substantially as set forth.

3. In an apparatus for the continuous production of illuminating-gas, the combination of a series of connected superposed retorts, rotary conveyers therein, a conducting-tower in connection with the lowermost retort, a rotary delivery mechanism below the lower funnel-shaped end of said tower, chutes in connection with said mechanism for conducting the delivered coke to water-gas generators, a cooling-chamber below said mechanism and connected therewith and contracted toward its lower end, a water filled and sealed discharge-pit below said chamber, said pit having a central channel, and an inclined rotary conveyer mounted therein and having a perforated conveyer-screw allowing the return of the water in carrying the cooled coke out of the discharge-pit, substantially as set forth.

4. In an apparatus for the continuous production of illuminating-gas, the combination of a series of connected superposed retorts, rotary conveyers therein, a conducting-tower in connection with the lowermost retort, a coke-cooling chamber below said tower, and a delivery mechanism between said tower and chamber, said delivery mechanism having an outer casing and an inner rotary distributing-cone having in its side faces openings corresponding to chutes conducting to water-gas generators a portion of the coke passing from the tower, substantially as set forth.

5. In an apparatus for the continuous production of illuminating-gas, the combination of a series of connected superposed retorts, rotary conveyers in said retorts, exterior jackets surrounding said retorts, a tower connected with the lowermost retort, a rotary delivery mechanism at the lower end of said tower, chutes for connecting the delivery mechanism with water-gas generators, a coke-cooling chamber below said delivery mechanism and connected therewith, a gas-mixing chamber connected with the jacket of the lowermost retort, and flues for conducting the waste gases from said generators to the mixing-chamber, substantially as set forth.

6. In an apparatus for the continuous production of illuminating-gas, the combination of a series of superposed retorts, a conducting-tower connected therewith, a delivery mechanism below said tower, a coke-cooling chamber beneath said mechanism, said chamber being connected therewith and having in its walls a protected spiral conducting-pipe for the steam to be superheated for the water-gas generation, substantially as set forth.

In testimony that I claim the foregoing as my invention I have signed my name in presence of two subscribing witnesses.

EDUARD R. BESEMFELDER.

Witnesses:
LUDWIG WENGHÜFFER,
CLARA KOHN.